June 15, 1926. 1,588,963

C. J. HARTER

GEAR TESTING APPARATUS

Filed July 18, 1923   6 Sheets-Sheet 1

INVENTOR
C. J. Harter
BY
Howard P. Denison
ATTORNEY

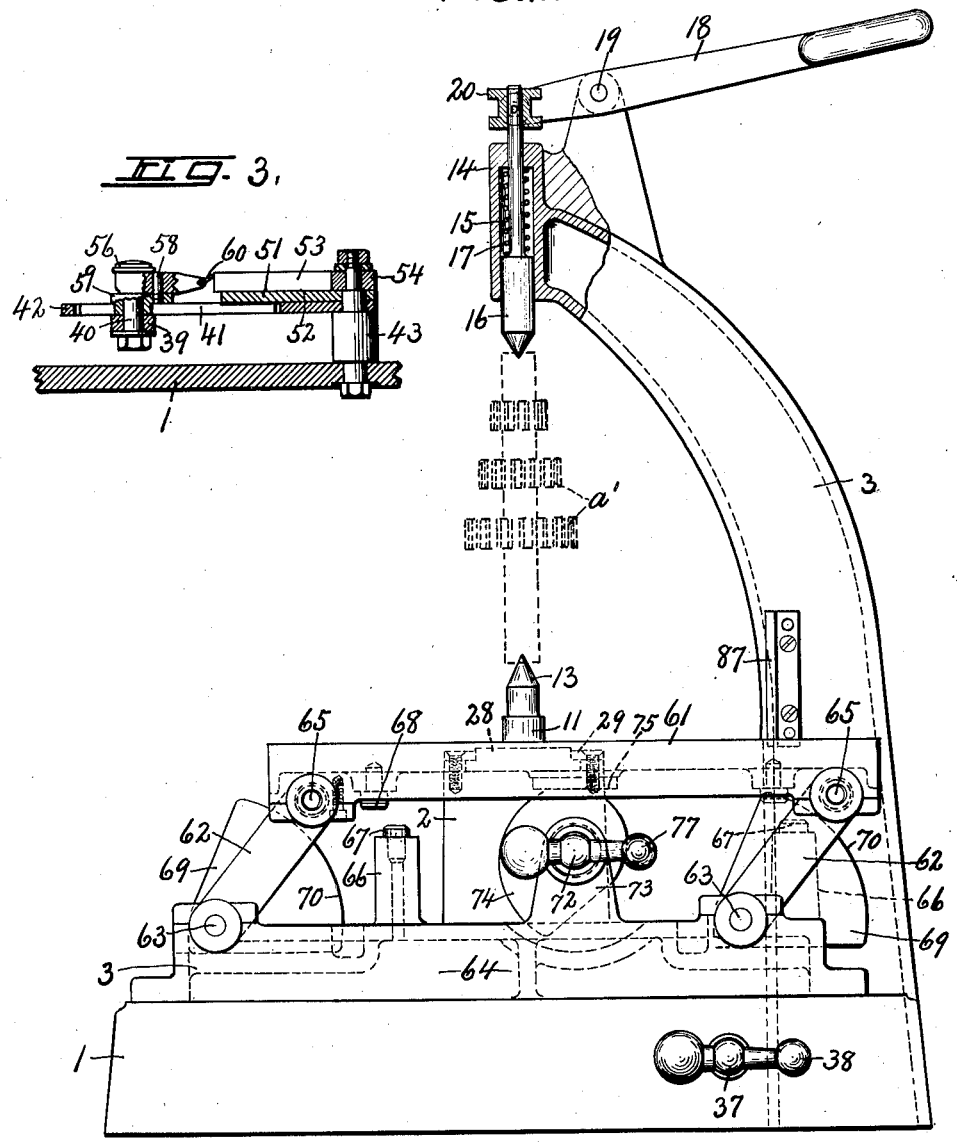

June 15, 1926.
C. J. HARTER
1,588,963
GEAR TESTING APPARATUS
Filed July 18, 1923    6 Sheets-Sheet 3
Fig. 4.
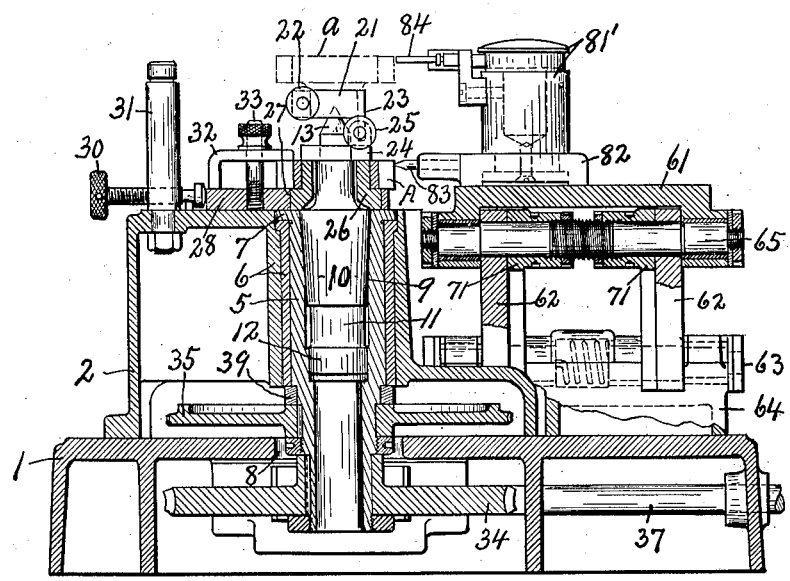
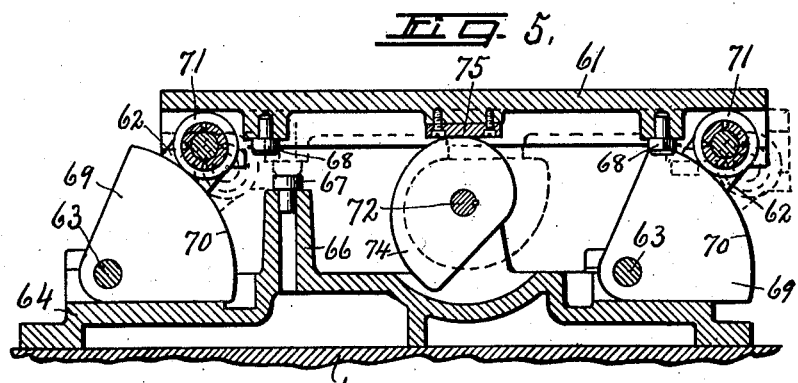
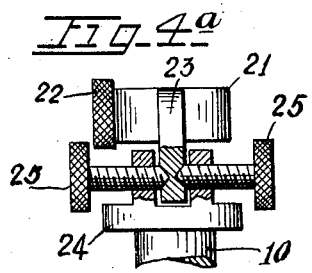
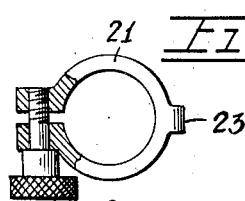

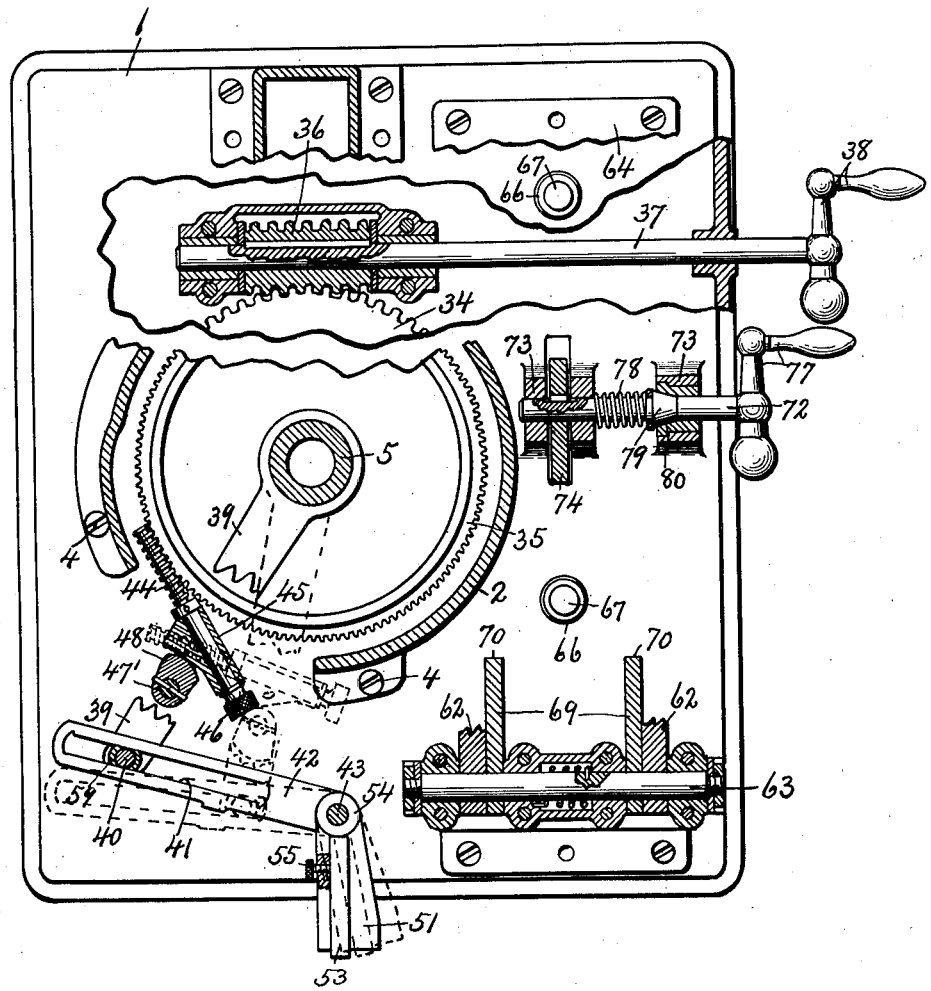
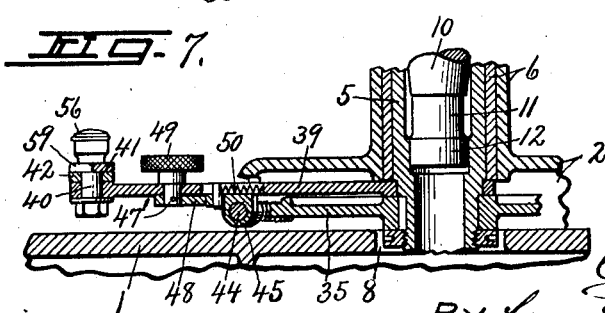

June 15, 1926.

C. J. HARTER 1,588,963

GEAR TESTING APPARATUS

Filed July 18, 1923      6 Sheets-Sheet 5

June 15, 1926.
C. J. HARTER
1,588,963
GEAR TESTING APPARATUS
Filed July 18, 1923
6 Sheets-Sheet 6
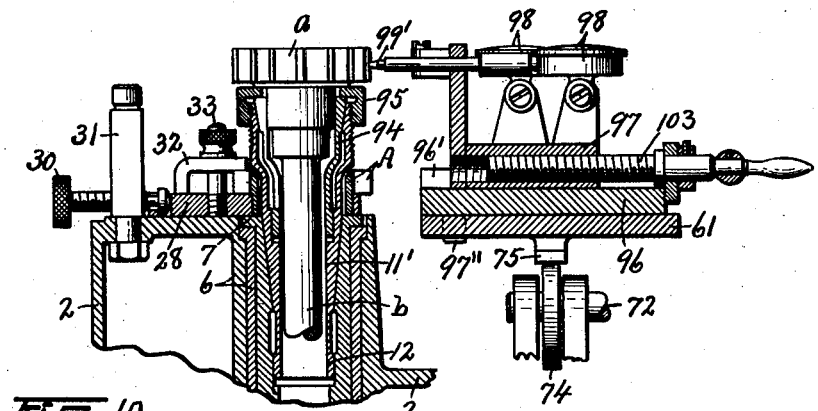
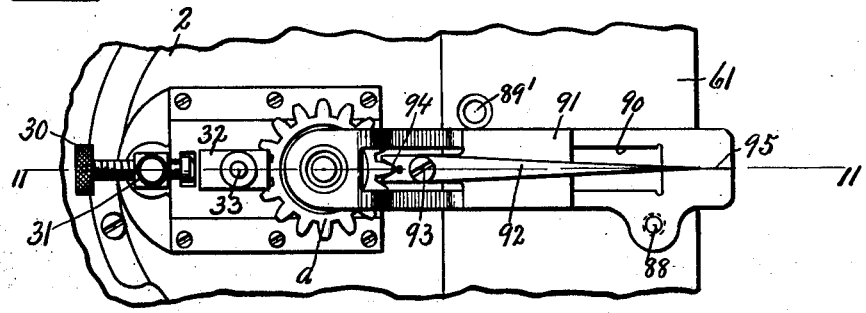
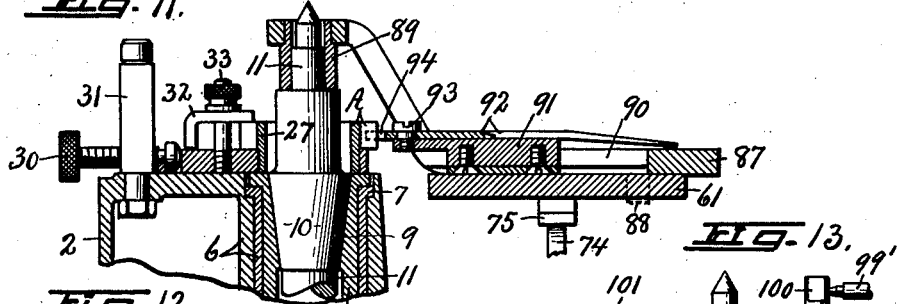
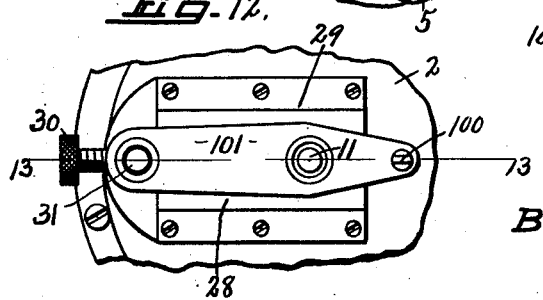
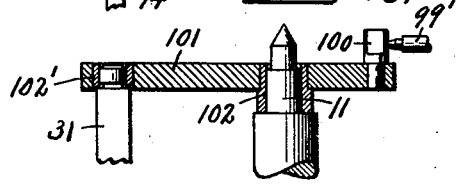

Patented June 15, 1926.

1,588,963

UNITED STATES PATENT OFFICE.

CLARENCE J. HARTER, OF SHREWSBURY, MASSACHUSETTS.

GEAR-TESTING APPARATUS.

Application filed July 18, 1923. Serial No. 652,275.

This invention relates to apparatus for testing gears of the class set forth in my pending applications, Serial Number 501,873 filed September 20, 1921, allowed January 26, 1923, and Serial Number 501,872 filed September 20, 1921, the main objects of which are to test the accuracy of the teeth of the gears and cutters as to contour, angles, depths, heights, pitch diameter and spacing of the teeth according to prescribed formulæ or master gear which has been previously cut and finished to conform to such formulæ, and at the same time to provide simple and efficient means for indicating any deviation of said contour, angles, depths, heights, pitch diameter or spacing of the teeth under test and thereby, to enable the inaccuracy to be easily and quickly detected for correction.

One of the specific objects of the present invention is to enable all of these tests for a single gear or for a combination of coaxial gears to be made at one setting.

The indicators used for testing purposes are adapted to be moved by hand across and upon a suitable supporting plate having a flat smooth surface in a plane at right angles to the axis of the gear or gears under test, and another object of the invention is to provide means whereby this supporting plate may be adjusted vertically to different parallel planes to enable the indicator to be used for testing different portions of the same tooth through its face width, and also for testing the teeth of coaxial gears at different heights.

A further object is to provide convenient means for accurately adjusting the gear under test and also the master gear, one tooth space at a time so that the tests by the indicators may be made in approximately the same working position.

Another object is to provide simple means for affecting a slight radial adjustment of the master gear relatively to the arbor for the gear under test to compensate for any negligible difference in diameter of the master gear and the gear under test resulting from the allowable working tolerance on the pitch diameter of the work.

Another object is to provide means for axially alining the teeth of the gear under test with those of the master gear.

Other objects and uses relating to specific parts of the apparatus will be brought out in the following description.

In the drawings:—

Figure 2 is a side elevation of the same apparatus except that the indicators on the surface plate are omitted, said surface plate being shown as slightly elevated from its normal position of rest in both Figures 1 and 2.

Figure 3 is a detail sectional view of a portion of the gear-indexing mechanism taken on line 3—3, Figure 1.

Figure 4 is a sectional view taken on line 4—4, Figure 1, except that the rear supporting bracket for the upper centering pin is removed, but showing a single gear under test with means for adjusting the same rotarily relatively to the master gear for bringing the teeth of both gears into vertical alinement.

Figure 4ᵃ is an enlarged side elevation from the right hand side, Figure 4, of the means for rotarily adjusting the clamping collar for the gear under test.

Figure 4ᵇ is an enlarged top plan of the clamping collar for the gear under test.

Figure 1:
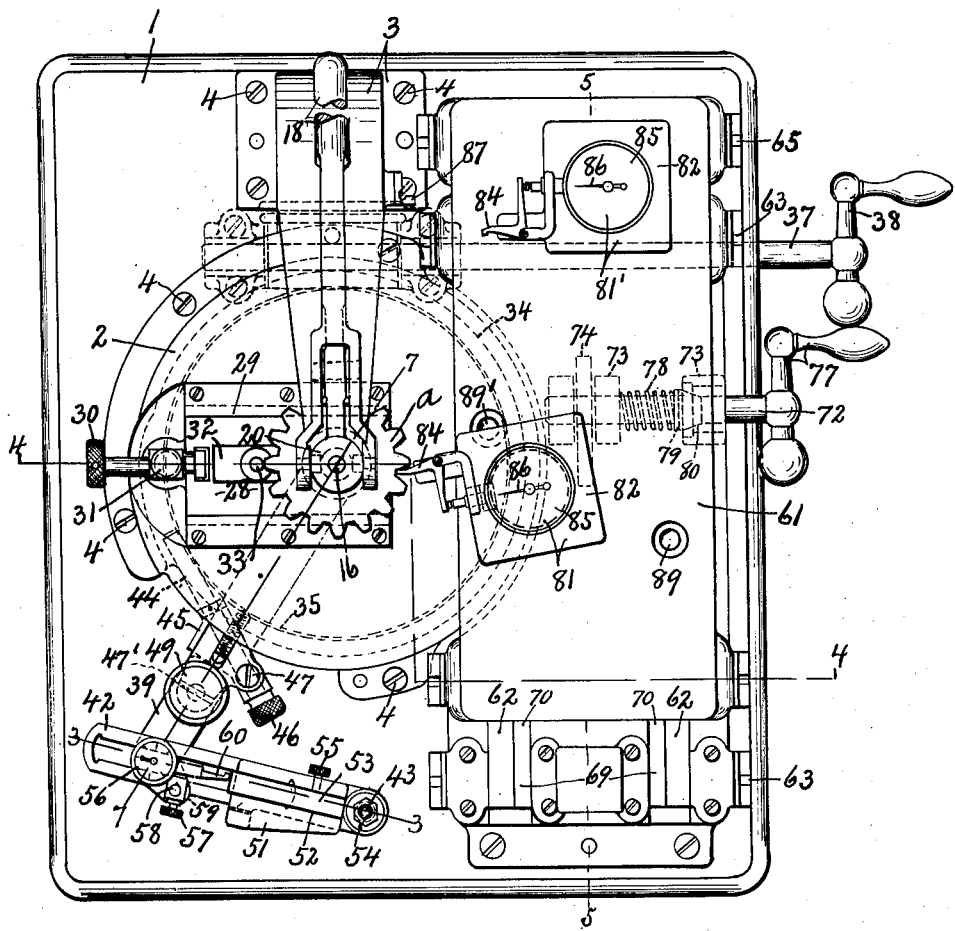
Figure 1 is a top plan of one form of my invention as used for testing one or more coaxial spur gears by comparison with a master gear.

Figure 5 is a sectional view taken on line 5—5, Figure 1, showing more particularly the surface plate and its adjusting means.

Figure 6 is a horizontal sectional view of the same machine in planes below the surface plate showing more particularly the indexing mechanism for adjusting the gears rotarily one tooth space at a time, and also the means for raising and lowering the surface plate.

Figure 7 is a detail sectional view taken on line 7—7, Figure 1.

Figure 8:
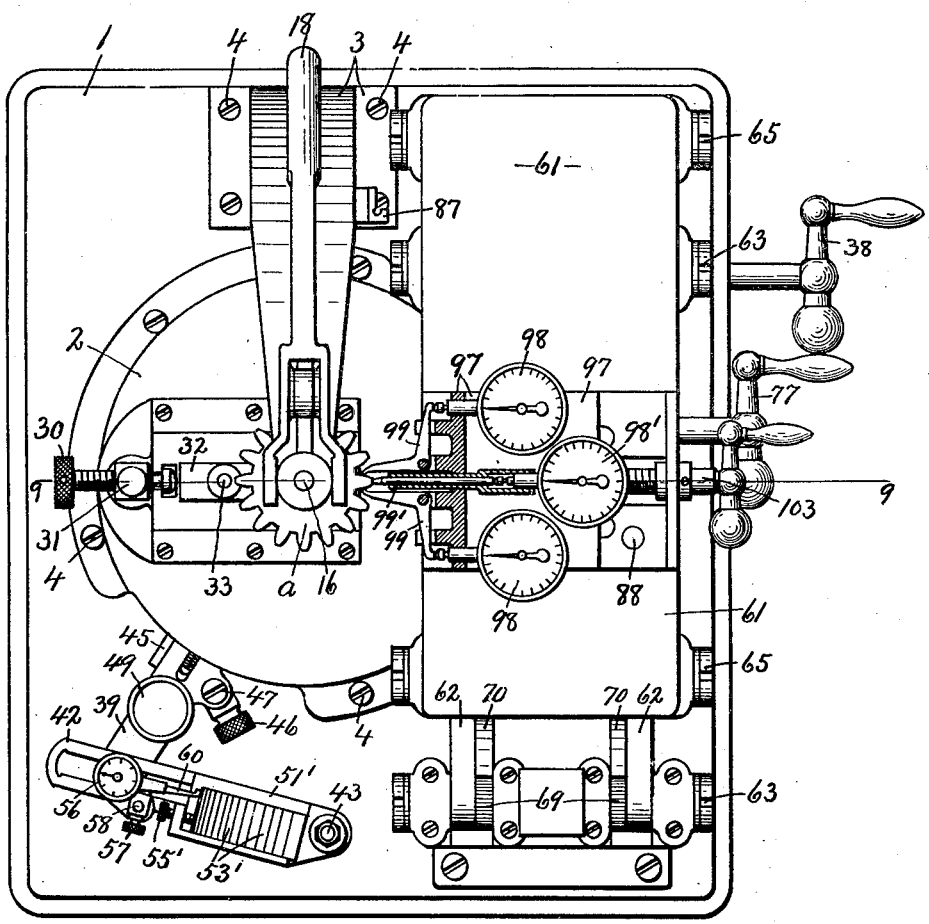

Figure 8 is a top plan, partly in section, similar to Figure 1, except that the surface plate is in its extreme down position, the sliding indicators are omitted, the charting device is placed in operative position on the surface plate to aline the teeth of the gear under test with those of the master gear and for testing said teeth, and the spacing gauge of the indexing device is shown as made up of sections.

Figure 9 is a vertical sectional view taken on line 9—9, Figure 8, except that the indicators are shown in elevation.

Figure 10 is a top plan of a portion of the machine as shown in Figure 2, with the setting device for the master gear in operative position upon the surface plate.

Figure 11 is a sectional view taken on line 11—11, Figure 10.

Figure 12 is a top plan of a portion of the machine, showing the gauge by which the charting device may be set for alining and testing the teeth of the gear under test.

Figure 13 is a sectional view taken on line 13—13, Figure 12.

As illustrated, this apparatus comprises a main supporting frame or base —1— having a hollow top section —2— and a bracket —3— rising from the upper face of the rear portion of the base —1— and both rigidly secured by bolts or screws —4— to said base to form a unitary part of the main supporting frame.

An upright tubular shaft —5— is journaled in suitable bearings —6— on the frame section —2— with its upper end in a horizontal plane substantially coincident with that of said section, and provided with an annular enlargement or flange —7— adapted to rest upon the upper end of the bearing —6—, the lower end of said shaft being extended through a relatively large opening —8— in the top of the base —1— to communicate with an underlying gear chamber.

This tubular shaft —5— is provided with a central lengthwise bore extending therethrough from end to end and having its upper end enlarged and tapered at —9— for receiving a correspondingly tapered portion —10— of a gear supporting arbor —11— whereby the latter may be frictionally held in the tubular shaft to rotate therewith, and at the same time, permitting it to be removed by upward displacement when desired.

The lower end of the arbor —11— is cylindrical and constitutes a centering pilot adapted to engage in a similar cylindrical part —12— of the bore for additionally holding the arbor in exact coaxial alinement with the tubular shaft.

The upper end of the arbor is reduced in diameter and provided with a tapered centering point —13— adapted to receive and center the hub or shaft of the gear to be tested thereon.

The bracket —3— extends upwardly and inwardly from one side of the base —1— and has its upper end overhanging the centering pin of the section —2— and provided with an upright hub —14— having a guide opening —15— coaxial with the axis of the tubular shaft —5— for receiving and guiding an upper vertically movable centering pin —16— which is spring pressed downwardly by a coil spring —17— in said socket for engaging the centering pin —16— with the upper end of the supporting shaft of the gear as —a— or gears as —a'— under test as shown in Figure 2.

The centering pin —16— may be withdrawn from its operative position against the action of the retracting spring —17— by means of a hand lever —18— which is pivoted at —19— to the bracket —3— and is adapted to engage a grooved collar —20— on the upper end of the centering spindle —16—.

When a single gear as —a—, Figure 4, is to be tested, it is centered upon the lower centering pin —13— and clamped in a split collar —21— having a clamping screw —22— at one side and spaced pendant lugs —23— at its opposite side.

Another collar —24— may be clamped to the upper end of the mandrel —11— just below the centering pin —13— and provided with tangent screws —25— for engaging opposite sides of the lug —23—, and thereby adjusting the gear —a— rotarily to bring its teeth into vertical alinement with those of a master gear as —A—.

This master gear is fitted over and upon the reduced upper end of a sleeve —26— which surrounds the upper portion of the arbor —11— just above the top of the frame section —2— so as to rest upon the upper end of the tubular shaft —5—, said sleeve having its central opening of slightly greater diameter than that of the portion of the arbor —11— which it surrounds to allow limited radial adjustment of said sleeve with the master gear thereon for the purpose of bringing it into proper coaxial relation to the gear under test in case the latter should be slightly decentered or deformed relatively to its centering pin —13—.

For this purpose, the lower end of the sleeve is closely fitted in an opening —27— in a radially adjustable slide plate —28— which is supported in guides —29— on the upper face of the frame section —2— and is adapted to be moved horizontally along the guides by means of an adjusting screw —30— which is engaged in a threaded aperture in an upright post —31— on the frame section —2—.

The master gear —A— and its supporting sleeve —26— may be held against rotation during the testing operation by means of an angular clamping plate —32— and a clamping bolt —33—, Figure 4, and may also be adjusted rotarily when setting the master gear by simply loosening the clamping screw —33—.

Relatively large lower and upper worm gears —34— and —35— are keyed or otherwise secured to the lower reduced end of the tubular shaft —5— below and above the top wall of the base —1— respectively, the lower worm gear —34— being engaged by a worm —36— on the inner end of a horizontal shaft —37— which is journaled in suitable bearings on the base —1—, Figure 6, and has its outer end provided with a hand crank —38— by which the shaft of the worm thereon may be rotated for rotating the tubular shaft —5— and gear supporting mandrel —11—, one gear tooth space at a time.

A radially extending arm —39— is journaled at one end upon the tubular shaft —5— between the upper face of the worm gear —35— and lower end of the bearing —6— to turn freely relatively to said shaft and has its outer end extended some distance beyond the periphery of the worm gear —35— and provided with a stud —40— which is slidable in a slot —41— in one end of a horizontally swinging arm —42—, Fig. 6.

The other end of this arm —42— is pivoted to a vertical post —43— on the top of the base —1— to swing horizontally, the axes of the stud —40— and post —43— being equal distances from the axis of the tubular shaft —5— around which the arm —39— is adapted to swing so that lines drawn between said axes form the sides of an isosceles triangle of which the line between the axes of the stud —40— and post —43— forms the base or cord of the arc through which the stud —40— is adapted to swing.

A horizontal screw spindle —44— is journaled in a suitable bearing —45— for engagement with the upper worm gear —35— and is provided with a handle —46— by which it may be rotated in said bearing, which latter is pivoted at —47— to the arm —39— to swing in a horizontal plane and thereby to move the threaded end of the spindle —44— into and out of mesh with the gear —35—.

An upright spindle —47'— is journaled in the arm —39— and is provided with a cam —48— and a hand wheel —49— by which the spindle with the cam thereon may be rotated into and out of engagement with the bearing —45— to hold the screw —44— in engagement with the gear —35— and to permit the same to be rocked out of engagement with said gear about the axis of the pivot —47—, at which time, the arm —39— will be free to swing about the axis of the tubular shaft —5— preparatory to making the necessary adjustment of the gear under test, one tooth space at a time.

The screw supporting bearing —45— is spring pressed against the periphery of the cam —48— by means of a spring —50— which is interposed between one end of a slot in the arm —39— and a pin on the hub —45— and also serves to automatically force the screw —44— out of engagement with the gear —35— when the cam —48— is turned away from the bearing —45—. (See Figure 7.)

A gage supporting arm —51— is pivotally mounted at one end upon the stud —43— to swing about the axis thereof to and from a position across the upper face of the arm —42— and is provided with a groove —52—, Fig. 3, for receiving a tooth spacing gage —53— having one end abutting against a hardened metal sleeve —54— on the stud —43— and therefore, coaxial with the stud 43, said gage bar being held in place upon the arm —51— by a set screw —55—. (See Figures 1, 3 and 6.)

The distance between the periphery of the hardened sleeve —54— and outer end face of the gage bar —53—, which is also made of hardened steel, determines the amount of rotary adjustment of the gear under test for one tooth space of said gear so that when the swinging support —51— with the gage block thereon is swung to a position directly over the arm —42—, the radial lines passing through the periphery of the sleeve —54— and outer end face of the gage bar —53— will intersect the pitch circle of the gear at points corresponding to the spaces between the teeth from center to center.

This gage block —53— is adjustable in its guide slot —52— to vary the distance between its outer end and the periphery of the sleeve —54— as may be required for different spacing of the gears under test, but it is evident that the same result may be accomplished by making the gage block in sections of predetermined thickness and using such sections as may be necessary to give the required length.

A dial indicator —56— of any suitable known construction is secured by a set screw —57— to a post —58— on a suitable supporting member —59— which is mounted upon the stud —40— to slide in the slot —41— of the arm —42—, the opposite sides of the portion of said supporting member —59— projecting into the slot —41— being flattened to ride against the walls of said slot and thereby, to hold the indicator against turning movement relatively to the bar —42—.

This indicator is provided with a movable contact member —60— and with suitable means for transmitting motion therefrom to the pointer of the indicator, the dial of which is adjustable to register any particular graduation with the pointer.

In order to adjust the gear under test rotarily, one tooth space at a time, the gage supporting member — 51— is swung by hand from its operative position shown in Figure 1, to its inoperative position shown in Figure 6, the hand wheel —49— is then rotated counter-clockwise to displace the cam —48— from its holding position, thus permitting the spring —50— to rock the screw —44— and its support —45— away from the gear —35— or from the position shown by full lines in Figure 1 to the position shown by dotted lines in Figure 6, after which the arm —39— is rocked laterally about the axis of the tubular shaft —5— to bring the contact member —60— into contact with the periphery of the sleeve —54—, Fig. 3, until the pointer of the indicator —56— registers with the zero graduation on the dial so that the same reading may be used with the gage in a manner presently described.

The screw —44— is then re-engaged with its gear —35— and locked in place by the cam —48— whereupon, the shaft —37— is rotated by its handle —38— to adjust the gears —34— and —35— rotarily, thereby imparting similar angular movement to the arm —39— by reason of the engagement of the screw —44— with the gear —35— until the contact member —60— is moved away from the sleeve —54— a distance slightly greater than the length of the gage —53— whereupon the gage block with the gage thereon is restored to its operative position as shown in Figure 1, and the direction of rotation of the shaft —37— is then reversed to bring the contact member —60— into engagement with the outer end of the gage —53— until the pointer is again registered with the zero graduation, which means that the gear under test has been adjusted rotarily one tooth space, this operation being repeated as each tooth is tested.

A horizontal surface plate —61— is mounted for parallel vertical movement upon the base —1— through the medium of parallel links —62— arranged in pairs, each pair supporting one end of the plate, those of each pair being pivoted at —63— to a supplemental base —64— on the main base —1— to swing in vertical planes while their upper ends are pivoted at —65— to opposite ends of the surface plate for supporting the latter in a horizontal plane in all positions of adjustment.

Rising from the upper face of the supplemental base —64— are a pair of posts —66— having hard metal seats —67— at their upper ends for receiving similar hard metal stops —68— on the under side of the surface plate —61—, for supporting said plate in a normal position of rest.

Secured to opposite ends of the supplemental base —64— are separate pairs of bearing members —69— having curved bearing faces —70— concentric with the axes of their respective pivots —63— and adapted to be engaged by eccentric bearings —71— which are mounted coaxially upon the pivotal bearings —65— for engagement with the curved bearing faces —70— and thereby, additionally holding the surface plate in a horizontal plane, said eccentrics being adjustable rotarily to take up wear.

The means for adjusting the plate vertically consists of a horizontal cam shaft —72— journaled in suitable bearings —73— on the supplemental base —64— parallel with the shaft —37— and pivotal pins —63— and —65— and having its inner end provided with a cam —74— for engagement with a hardened bearing —75— on the underside of the surface plate —61—, the outer end of said cam shaft being provided with a hand piece —77— by which it may be rotated.

The cam shaft —72— is movable axially against the action of a retracting spring —78— and is provided with a conical friction member —79— adapted to engage the walls of a conical socket —80— when operated by the spring —78— for holding the cam —74— in its adjusted position.

The upper surface of the plate —61— is flat and smooth and is disposed in a plane at right angles to the axis of the tubular shaft —5— and gear supporting mandrel —11— for receiving and supporting a pair of testing instruments —81— and —81'— commonly known in the trade as "The B. C. Ames dial indicator" having flat bases —82— slidable by hand across and upon the surface of the plate —61—.

These testing instruments are provided with relatively fixed and movable contact members —83— and —84— and suitable dials —85— and pointers —86—, the pointers being movable around their respective dials which latter are also adjustable circumferentially relatively to the pointer in setting instruments for the work to be performed.

The movable contact members —84— are similar, but reversely arranged for engagement with opposite faces of the teeth of the gear under test and are operatively connected to their respective pointers for actuating the same to determine any inaccuracy in the contour of the teeth.

The relatively fixed contact members are adapted to engage the teeth of the master gear —A— at any point, while the contact members —84— are adapted to contact with the corresponding point of the tooth under test when the teeth of both gears are vertically alined with each other.

Any suitable means may be employed for establishing this vertical alinement of the teeth of the master gear and gear under test and for setting them in definite relation to the surface plate —61— so that two of the vertically alined teeth will lie in a plane passing through the axis of the tubular shaft —5—, parallel with the axes of the movement of the surface plate.

The contact members —83— and —84— are arranged in spaced relation one above the other corresponding to the vertical spacing of the gears —A— and —a— on the arbor —11— with their outer ends in a vertical plane parallel with the axis of said arbor, and in order that they may be properly set for testing purposes each instrument is moved along the surface plate to bring the point of its lower fixed contact member into engagement with the corresponding side of a gauge block —87— which is secured to the bracket —3— in proximity to the adjacent side of the surface plate —61— with its opposite sides in parallel vertical planes.

When the point of the fixed contact member —83— is brought into engagement with its corresponding side of the gauge block —87— the point of the movable contact member —84— will be brought into engagement with the same side of the gauge block and in the same vertical plane, whereupon the dial —85— of that instrument may be adjusted to bring its zero graduation into registration with the corresponding pointer —86—.

The instrument is then moved along the surface of the plate —61— to bring the point of the fixed contact member —83— into contact with any point of the master tooth —A— at which time, the point of the movable contact member —84— will be brought into contact with a corresponding point of the overlying tooth of the gear under test and by slowly moving the plate —61— up and down through the medium of the handle —77— and keeping the contact members in engagement with the teeth of the master gear and gear under test, it is evident that if the corresponding parts of both teeth are alike, the pointer will remain at zero, but if there is any deviation in any point of the gear under test, it will be indicated by the change of the position of the pointers —86— on the dial.

Suitable means is provided for setting the master gear as —A—, so that a radial line passing through the center of one of the teeth will be at right angles to the longitudinal center of the surface plate —61— when the latter is in its extreme down position, said means consisting in this instance of a bearing —87—, Figures 10 and 11, having one end substantially flat to rest upon the upper surface of the plate —61— and provided with a stud —88— adapted to enter a hole in said surface plate to hold those parts against relative movement, the other end of said bar being deflected upwardly and laterally and is provided with a hollow hub —89—, and adapted to fit over and upon the upper end of the gear supporting arbor —11— thereby holding the bar —87— in a fixed position relatively to the arbor —11— and surface plate —61— which when mounted in the manner just described extends radially from the axis of the arbor and at substantially right angles to the longitudinal center of the surface plate.

The bar —87— is provided with a central guideway —90— for receiving a sliding block —91— carrying a pointer —92— which is pivoted thereto at —93— near one end to swing horizontally or in a plane parallel with the upper face of the surface plate —61—.

The shorter arm of the pointer —92— faces the master gear —A— and is provided with a central V-shape cut-out —94— to form opposite outwardly converging walls for engaging one of the teeth of the master gear and thereby centering that tooth relatively to the longitudinal center of the bar or radial to the pivot —93—.

The longer arm of the pointer is pointed to register with a fixed graduation —95— on the end of the bar —87— and in a direct line passing through the axes of the pivot —93— and arbor —11—.

The block —91— with the pointer —92— thereon, may be moved by hand along the guideway —90— to bring the notched end into and out of engagement with the adjacent tooth of the master gear which may be adjusted rotarly by hand when the clamp —32— is loosened to permit the registering tooth to be properly centered by the pointer when the latter is registered with the fixed graduation —95— after which the clamp —32— is tightened to hold the master gear in its set position, whereupon the bar —87— with the pointer thereon may be removed from the surface plate and arbor —11— to permit the teeth of the gear —a— under test to be tested in the manner previously described, and also to permit the use of a suitable device for alining the teeth of the gear under test with those of the master gear as shown in Figures 8 and 9.

In order that the device for alining the gear as —a—, under test with the master gear —A— may be more clearly understood, the former is shown in Figures 8 and 9, secured to a shaft —b— which is clamped in the upper end of the arbor as —11'— by means of a split chuck —94— which is adapted to be tightened and released upon and from the shaft —b— by means of a nut —95—, engaging the threaded upper end of the arbor —11'—, the upper end of the chuck —94— being tapered for engagement in a similarly tapered socket in the corresponding end of the arbor —11'— to facilitate the clamping of the shaft to the arbor.

The means for alining the gear —a— under test with the master gear —A— comprises a plate —96— having a pair of studs —97''— one of which is adapted to enter a previously mentioned hole for the stud 88 and the other to enter a hole —89'— in the surface plate —61— to hold said plate —96— in fixed relation to the surface plate and also to permit the first named plate to be removed and replaced at will.

The plate —96— is provided with a central guide —96'— adapted to receive a sliding block —97— which carries a plurality of, in this instance, three indicators —98— and —98'— of the "B. C. Ames dial indicator" type, two of these indicators being arranged equal distances from and at opposite side of the longitudinal center of the plate —96— while the other indicator —98'— is arranged in said longitudinal center which is coincident with a vertical plane passing through the axis of the arbor —11'— at right angles to the longitudinal center of the surface plate —61—.

A pair of similar bell crank levers —99— are pivotally mounted in reverse order upon the inner end of the sliding member —97— with one arm of each in engagement with the pointer-operating plunger of the corresponding indicator —98— and the other arms arranged to engage opposite faces of the teeth of the gear —a— under test as they are successively registered with the center line of the plate —96—.

A plunger —99'— cooperating with an alined plunger on the central indicator —98'— is reciprocally mounted in a central bearing in the inner end of the sliding member —97— to engage the point of the registering tooth of the gear —a—.

These indicators —98— and —98'— may be set to their zero positions by bringing their respective "feelers" such as the lever —99— and plunger —99'— into engagement with a suitable gauge —100—, Figure 12, said gauge being mounted upon the inner end of a gauge block —101— having sockets —102— and —102'— adapted to receive respectively, the upper end of the arbor —11—, Figure 11, and the upper end of the post —31— when the bar —101— is placed over and upon said arbor and post after the centering bar has been removed.

The width of the gauge —100— between the opposite flat sides thereof, corresponding to the width of the point of the master tooth or to some other prescribed formula so that when the inner ends of the bell crank levers are engaged with the flat sides of the gauge, their respective dials may be set to zero and in a similar manner when the inner end of the plunger —99'— is set against the outer face of the gauge, the dial of the corresponding indicator may also be set to zero.

When the dial indicators are properly set, the gauge —101— may be removed and the gear to be tested placed in operative position on the arbor as —11'—, and therefore, coaxial with the master gear ready to be tested.

In making this test, the gear as —a—, is adjusted rotarily by hand until one of its teeth is centered with the longitudinal center of the plate —96— as determined by the contact of the levers —99— with opposite faces of said tooth when the pointers of their respective indicators are at zero positions, and by moving the plate —96— by a hand screw —103— along its guide —96'—, the inner ends of the levers —99— will be correspondingly moved along opposite faces of the registering tooth of the gear —a— and if the readings of both of the indicators —98— are alike and correspond to a predetermined formula for the correct shape of the tooth, it indicates that the form of the tooth is correct, whereas, any inaccuracy in such form would be revealed by the indicators.

By a similar adjustment of the plate —96— through the medium of the screw —103—, the inner end of the plunger —99'— may be brought into engagement with the point of the tooth at about the same time that the inner ends of the levers —99— engage opposite faces of the tooth on the pitch diameter and if the central indicator —98'— reads at zero, it indicates that the radial projection of the tooth is correct. In like manner, each tooth of the gear —a— may be tested as to its outside diameter, pitch diameter contour and depth and the readings of the several indicators chartered to enable the inaccuracy of the gear to be properly corrected.

The spacing mechanism for successively presenting each tooth to a given position for testing purposes is substantially the same as that previously described except that the gauge bar —53— consists of a series of sections —53'— clamped in place in a swinging holder —51'— by means of a set screw —55'—.

The operation of my invention will now be readily understood upon reference to the foregoing description and accompanying drawings, and while the construction shown and described is particularly simple and efficient in carrying out the objects of my invention, it is evident that various changes may be made in the detail construction and arrangement of the various parts without departing from the spirit of this invention.

I claim:

1. In an apparatus for testing the accuracy of gear teeth, a rotary gear supporting arbor, a surface plate, a dial indicator movable by hand across and upon the surface plate and provided with a contact member for contact with the tooth under test, and means for adjusting said gear rotarily one tooth space at a time to bring its individual teeth to a certain testing position.

2. A gear testing apparatus as in claim 1 in which means is provided for adjusting the surface plate to different parallel planes lengthwise of the axis of the gear under test.

3. In an apparatus for testing the accuracy of gear teeth, means for supporting the gear under test for rotary adjustment about its axis, adjustable means for measuring the angular adjustment of said gear, a surface plate, and a testing instrument movable across and upon the surface plate and provided with a movable contact member for engaging the teeth of the gear and with means for indicating the movement of said contact member from a predetermined position.

4. A gear testing apparatus as in claim 3 in which the means for measuring the angular adjustment of the gear includes two contact surfaces at the base angles of an isosceles triangle disposed in a plane perpendicular to the axis of the gear under test and having its apex in the axis of the gear under test and its sides passing through the corresponding points of adjacent teeth of said gear, and means for setting those surfaces a given distance apart.

5. A gear testing apparatus as in claim 3, in which the means for measuring the angular adjustment of the gear includes a gage of a given length corresponding to the base of an isosceles triangle disposed in a plane perpendicular to the axis of the gear under test and having its apex at the axis of rotation of the gear and its sides passing through similar points of adjacent teeth of said gear.

6. A gear testing apparatus as in claim 3, in which the means for measuring the angular adjustment of the gear includes a gage of given length corresponding to the base of an isosceles triangle disposed in a plane perpendicular to the axis of the gear under test and having its apex at the axis of rotation of the gear and its sides passing through similar points of adjacent teeth of said gear, and means for varying the length of said gage.

7. A gear testing apparatus as in claim 3, in which the means for measuring the angular adjustment includes two contact members arranged at spaced points in a circular arc concentric with the axis of the gear and in lines radial to said axis and forming a central angle equal to that of the tooth-spacing of said gear, one of said members being adjustable about said axis, and a gage for setting the adjustable member at the desired distance from the other member.

8. In a gear testing apparatus, means for supporting a master gear and a gear to be tested in coaxial relation, means for setting the master gear with one of its teeth in a certain position, means for setting the gear under test with one of its teeth in endwise alinement with the tooth of the master gear, means for adjusting the gear under test rotarily one tooth space at a time, and means for testing the accuracy of the teeth of the gear under test as they are successively alined with said tooth of the master gear.

9. A gear testing apparatus as in claim 8, in which means is provided for adjusting the master gear radially.

10. In a gear testing apparatus, a rotary support for the gear to be tested, a slide movable radially of the gear, a pair of indicators mounted on the slide to move therewith and provided with contact members for engaging opposite faces of each tooth of the gear as they are successively registered with the adjacent faces of the contact members, and an additional indicator mounted on said slide to move therewith and provided with a movable contact member for engaging the point of each tooth as they are successively registered therewith by the rotation of the support.

11. In a gear testing apparatus, a support for a master gear, a master gear adjustable rotarily and radially upon the support, means for setting the master gear with one of its teeth at a certain point, means for clamping the master gear in its set position, means for rotatably supporting a gear to be tested coaxial with the master gear, a slide movable radially of the gear under test, and a pair of indicators mounted on the slide to move therewith, and provided with movable contact members for engaging opposite faces of each tooth of the gear under test as they are successively brought to a certain point by the rotation of the support.

12. In a gear testing apparatus, a support for a master gear, a master gear adjustable rotarily on the support, means for rotatably supporting a gear to be tested substantially coaxial with the master gear, a slide movable radially of the gear under test, an indicator mounted on the slide to move therewith and provided with a movable contact member for engaging the point of each tooth of the gear under test as they are successively registered with said contact member by the rotation of the gear under test.

13. In a gear testing apparatus, a support for a master gear, a master gear mounted on the support and adjustable rotarily and radially, means for setting the master gear with one of its teeth at a certain point, means for clamping the master gear in its set position, means for rotatably supporting a gear to be tested coaxial with the master gear, a slide movable radially of the gear under test, means on the slide for alining each tooth of the gear under test with the set tooth of the master gear, and an indicator mounted on the slide to move therewith and provided with a movable contact member for engaging the point of each tooth as they are successively registered therewith by the rotation of the gear under test.

14. In a gear testing apparatus, a support for a master gear, a master gear mounted on the support and adjustable rotarily about its axis, means for setting the master gear with one of its teeth in a certain position, means for clamping the master gear in its set position, means for rotatably supporting a gear to be tested coaxial with the master gear, a slide movable radially of the gear under test, a pair of indicators mounted on the slide to move therewith, and provided with movable contact members for engaging opposite faces of each tooth of the gear under test as the latter is rotated, and an additional indicator mounted on the slide to move therewith and provided with a movable contact member for engaging the point of each tooth as they are successively registered therewith.

In witness whereof I have hereunto set my hand this 12th day of July, 1923.

CLARENCE J. HARTER.